United States Patent
Lo et al.

(10) Patent No.: US 6,243,426 B1
(45) Date of Patent: Jun. 5, 2001

(54) APPARATUS AND METHOD FOR SLEW RATE CONTROL OF MLT-3 TRANSMITTER USING ZERO DRIVE

(75) Inventors: William Lo, Cupertino; Yi Cheng, San Jose, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/163,316

(22) Filed: Sep. 30, 1998

(51) Int. Cl.[7] .............................. H04L 25/34; H04L 25/49
(52) U.S. Cl. ...................... 375/289; 375/257; 375/288; 375/289; 341/68
(58) Field of Search ................................. 375/257, 286, 375/289, 295; 341/68–73

(56) References Cited

U.S. PATENT DOCUMENTS

| | | | |
|---|---|---|---|
| 3,927,401 | * 12/1975 | McIntosh | 340/347 |
| 4,808,970 | * 2/1989 | Arnaune | 341/73 |
| 4,873,524 | * 10/1989 | Akkermans | 341/73 |
| 4,905,257 | * 2/1990 | Palkert et al. | 375/87 |
| 5,280,500 | * 1/1994 | Mazzola et al. | 375/17 |
| 5,715,287 | * 2/1998 | Wadhawan | 375/377 |
| 6,008,746 | * 12/1999 | White | 341/70 |
| 6,069,511 | * 5/2000 | Mohan | 327/171 |

* cited by examiner

*Primary Examiner*—Chi Pham
*Assistant Examiner*—Mohammed Lachhab (57) ABSTRACT

A transmitter within a line driver circuit is configured to supply data signals in compliance with the Multilevel Transmission-3 (MLT-3) protocol for high speed data communication. The transmitter comprises a pre-driver system and a final driver. The pre-driver system comprises a plurality of individual pre-drivers that are in parallel. A zero drive logic designates any number of individual pre-drivers as zero drive types, such that these designated zero drive pre-drivers are turned ON during a zero signaling state. The partially turned ON pre-driver system, during the zero state, permits the final driver to rapidly output positive and negative signals in accord with the MLT-3 protocol.

22 Claims, 9 Drawing Sheets

APPARATUS AND METHOD FOR SLEW RATE CONTROL OF MLT-3 TRANSMITTER USING ZERO DRIVE

BACKGROUND OF THE INVENTION

1. Technical Field

The present invention relates to line circuits for transmitting digital data as an analog signal using zero drive, more particularly to a tri-state line driver configured for transmitting multilevel Transmission-3 (MLT-3) encoded signals.

2. Background Art

Local Area Networks (LANs) play a vital role in the successful and efficient operation f the modern office and find increasingly wide spread usage in the home. Users are able to exchange ideas and documents freely in a collaborative fashion. These exchanges take place in a variety of forms, from textual data to bandwidth intensive multimedia data. Accordingly, in an environment where multimedia information is commonly transferred, a high-speed network is needed to avoid unacceptably slow response times. Further, a LAN provides a cost-effective way to share resources such as printers, modems, etc. Manufacturers of LAN products continually develop faster, more reliable, and lower cost devices. One such LAN technology that addresses the growing need for high bandwidth is fast Ethernet, which supports the transmission of data signals at about 100 Mbps—ten times faster than traditional Ethernet LANs.

Local area networks use a network cable or other network media to link nodes (e.g., workstations, routers and switches) to the network. Each local area network architecture uses a media access control (MAC) enabling network interface device at each network node to share access to the media. Physical (PHY) layer devices are configured for translating digital packet data received from a MAC across a standardized interface, e.g., a Media Independent Interface (MII), into an analog signal for transmission on the network medium, and reception of analog signals transmitted from a remote node via the network medium. An example is the 100Base-TX Ethernet (IEEE Standard 802.3 u) transceiver, which is configured for transmitting and receiving a Multilevel Transmission-3 (MLT-3) encoded analog signal over unshielded (or shielded) twisted pair copper wiring.

In networks that employ unshielded twisted pair cabling, it is necessary to drive the unshielded twisted pair cable at high speed over a specific voltage swing. For a typical 100Base-TX network, the line driver is required to drive a 50 ohm load over a 2V swing at 125 Mbps. With these parameters, a large driver is needed, especially in light of the high transmission rate. Constructing a large driver yields a higher edge rate (i.e., slew rate), but ringing becomes problematic. It is thus a challenge to control the speed of the driver to attain a satisfactory edge rate while reducing or eliminating noise caused by the ringing effects. The noise is coupled from the driver to the near end receiver, which typically has power or ground closely coupled to that of the driver. The engineering trade-off thus is between speed and noise; i.e., a higher slew rate entails more noise coupling. Another key consideration is power consumption, which should be minimized while attaining a high edge rate with low noise characteristics.

Figure 1:
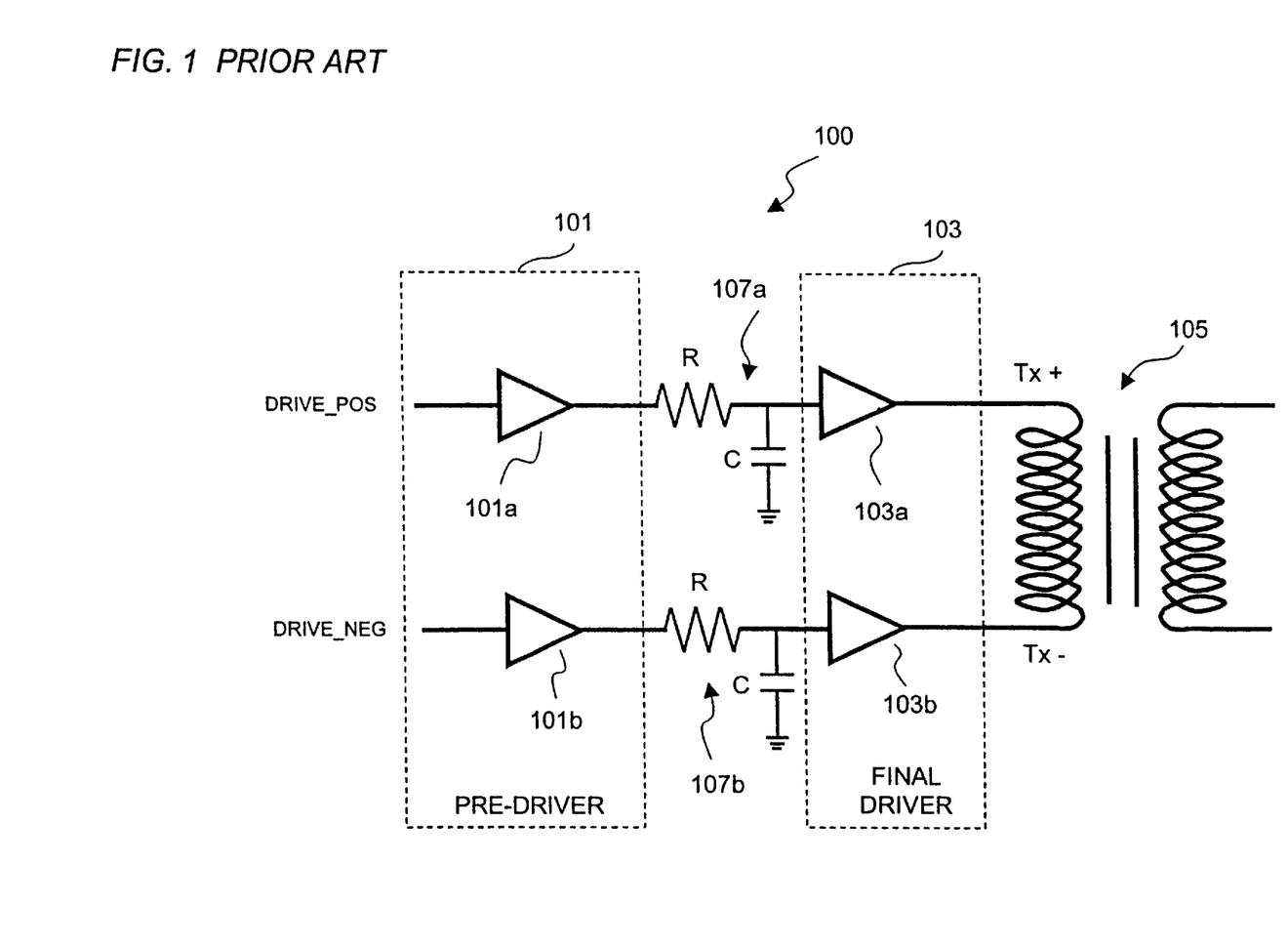
FIG. 1 is a diagram illustrating a prior art line driver.

In the past, the three factors of edge rate (slew rate), noise, and power consumption have been addressed separately. As shown in FIG. 1, a conventional line driver 100 has two stages: a pre-driver 101 and a final driver 103. Within the pre-driver 101, there exists a positive signal generator 101a and a negative signal generator 101b. These signal generators 101a, 101b control their larger counterparts, the signal generators 103a and 103b of the final driver 103. The RC delay circuits 107a, 107b between the pre-driver 101 and final driver 103 attempt to address the edge rate requirement. Essentially, the RC circuits 107a, 107b serve to slow the edge rates of the pre-driver 101. The edge rate of the final driver 103 is accordingly reduced. The outputs of the final driver 103 terminate at transformer 105. Therefore, to alter the edge rate of the final output signals, the RC circuits 107a, 107b must be tuned. Tuning becomes difficult and inflexible once the RC circuits are fabricated in an integrated circuit. Post-fabrication tuning necessitates physically altering the circuit.

Figure 2:
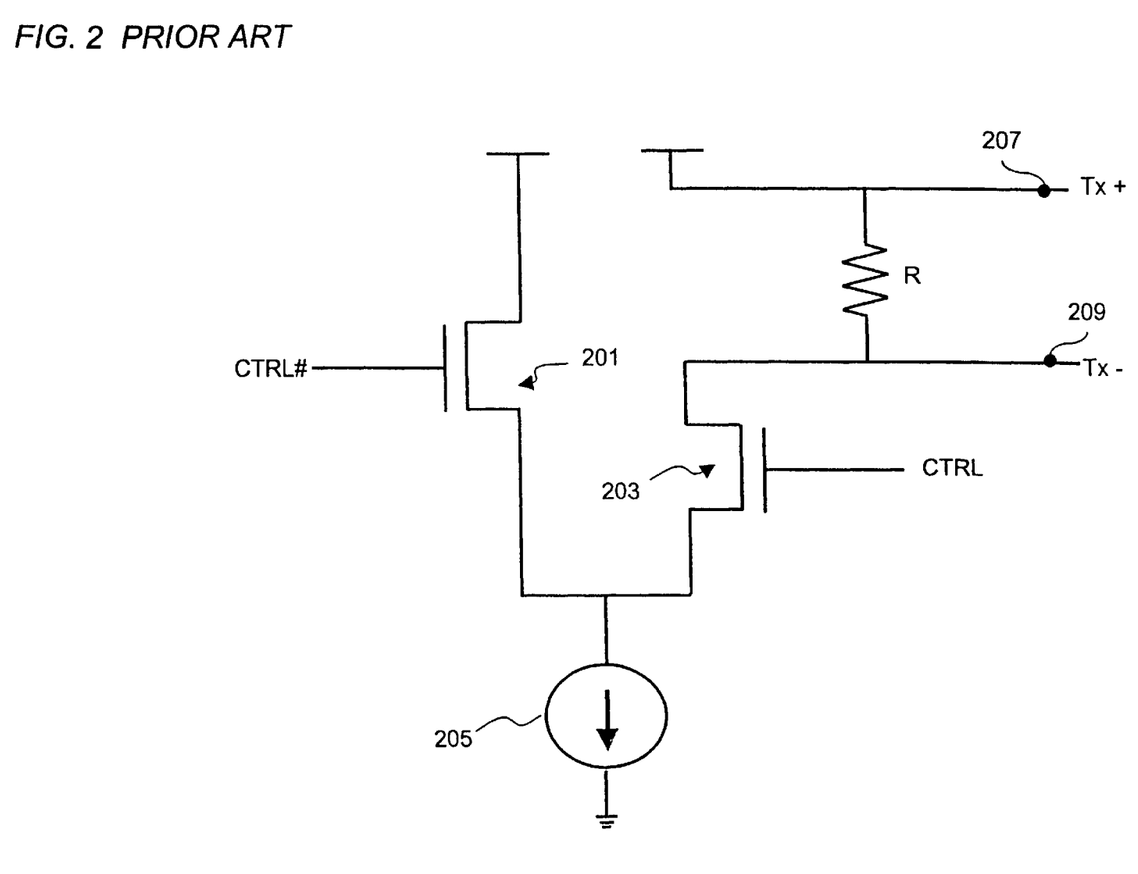
FIG. 2 is a diagram illustrating a prior art noise reduction circuit for the conventional line driver of FIG. 1.

Another circuit, as in FIG. 2, attempts to address the need for noise reduction. Transistors 201 and 203 receive control signals (CTRL, CTRL#) at their respective gates. A resistor is needed between terminals 207 and 209. A current source 205 is coupled to both transistors 201, 203. The noise problem is minimized by maintaining a constant current flow from power to ground.

Both of the above approaches require either extra transistors or RC components on the integrated chip, which is undesirable in terms of chip area and cost of having additional components. Moreover, the component values have to be fine tuned, which is a difficult and costly process, to adapt to various applications once the line driver circuit is fabricated. In addition, power considerations are usually examined after the performance objectives of slew rates and noise levels are obtained. Thus, circuit power consumption may be less than optimal.

SUMMARY OF THE INVENTION

There is a need for an arrangement for transmitting MLT-3 encoded signals that achieves a high slew rate (edge rate), while reducing noise. There is also a need for an arrangement for generating MLT-3 signals that exhibits low power consumption.

These and other needs are attained by the present invention, where a line circuit is made up of two driver stages for transmitting encoded data signals: a pre-driver system, and a final driver. The pre-driver system is made up of a plurality of individual pre-drivers arranged in parallel. A zero drive logic designates any number of individual pre-drivers as zero drive capable, such that these designated zero drive pre-drivers are turned ON (i.e., activated) during a zero signaling state. Typically, because the individual pre-drivers are not all zero drive pre-drivers, the pre-driver system causes the final driver to be partially ON. This permits the final driver to rapidly output positive and negative signals in accord with the MLT-3 signaling protocol.

According to one aspect of the present invention, a line circuit for transmitting encoded signals comprises a pre-driver circuit, which comprises (1) positive pre-driver stages for outputting positive pre-drive output signals in response to the first input signals, respectively, and (2) negative pre-driver stages for outputting negative pre-drive output signals in response to the second pre-driver input signals, respectively. The pre-driver circuit outputs a positive collective signal based on the positive pre-drive output signals and a negative collective signal based on the negative pre-drive output signals. A pre-driver control logic generates the first and second input signals based on a first driver signal and a second driver signal. Further, the pre-driver control logic selects at least one of the positive pre-driver stages and at least one of the negative pre-driver stages for outputting the respective positive and negative pre-drive output signals in response to a zero state in the first and second driver signals. An output driver generates first and second output signals as the encoded signals in response to the positive and negative collective signals, respectively. The output of the positive and negative pre-drive output signals during the zero state ensures that the output driver is partially activated during the zero state. Hence, the slew rate of the encoded signals is significantly enhanced, while the noise level is minimized.

Another aspect of the present invention provides a line circuit for transmitting encoded signals. The line circuit comprises a pre-driver circuit configured for generating a collective positive input signal and a collective negative input signal. The pre-driver circuit comprises a plurality of individual pre-drivers whereby each of the individual pre-drivers comprises a positive signal generator and a negative signal generator that operate according to a corresponding gain. A final driver is coupled to the pre-driver system for generating a positive output signal and a negative output signal in response to the collective positive input signal and the collective negative input signal. A pre-driver control logic activates a selected individual pre-driver to turn ON both positive signal generators and negative signal generators simultaneously during a zero signaling state. The pre-driver control logic individually controls each of the plurality of individual pre-drivers. Hence, the line circuit advantageously provides a low power consumption transmitter with high edge rate performance.

Still another aspect of the present invention provides a method for transmitting data signals over a network medium. The method comprises supplying first and second pre-driver signals to a first positive pre-driver stage and a first negative pre-driver stage based on received first and second driver signals, respectively. The method also includes supplying first and second inverted pre-driver signals, which have inverse values relative to the first and second pre-driver signals, to a second positive pre-driver stage and a second negative pre-driver stage, respectively, and then, outputting a positive collective signal based on outputs from the first and second positive pre-driver stages in which the second positive pre-driver stage is active during a zero state. In addition, the method comprises outputting a negative collective signal based on outputs from the first and second negative pre-driver stages in which the second negative pre-driver stage is active during a zero state. The method further comprises generating first and second output signals as the data signals based on the positive and negative collective signals, respectively. With this method, MLT-3 encoded signals can be transmitted at high speeds with improved edge rate and noise performance.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Although the present invention has direct applicability to transmission of data signals using the MLT-3 (Multilevel Transmission-3) signaling protocol in a 100Base-TX data networking environment, it will become apparent that the present invention is also applicable to other signaling protocols and PHY layer devices (e.g., 10/100 Ethernet transceivers).

MLT-3 transmission is most often used for twisted pair cables. Under this tri-state signaling protocol, the line driver generates three levels of signals, which can be symbolically represented by +1, 0, and −1. As shown in FIG. 1, typically the line driver 100 (i.e., transmitter) has two outputs, Tx+ and Tx−, which represent a transmit positive terminal and a transmit negative terminal, respectively. These terminals are terminated by a transformer 105. Signal +1 is generated when the Tx+ is driving the line, and Tx− is OFF. Similarly, Tx-produces the −1 signal while Tx+ is OFF. Lastly, 0 is produced when neither Tx+ nor Tx− is driving the line.

Figure 3:
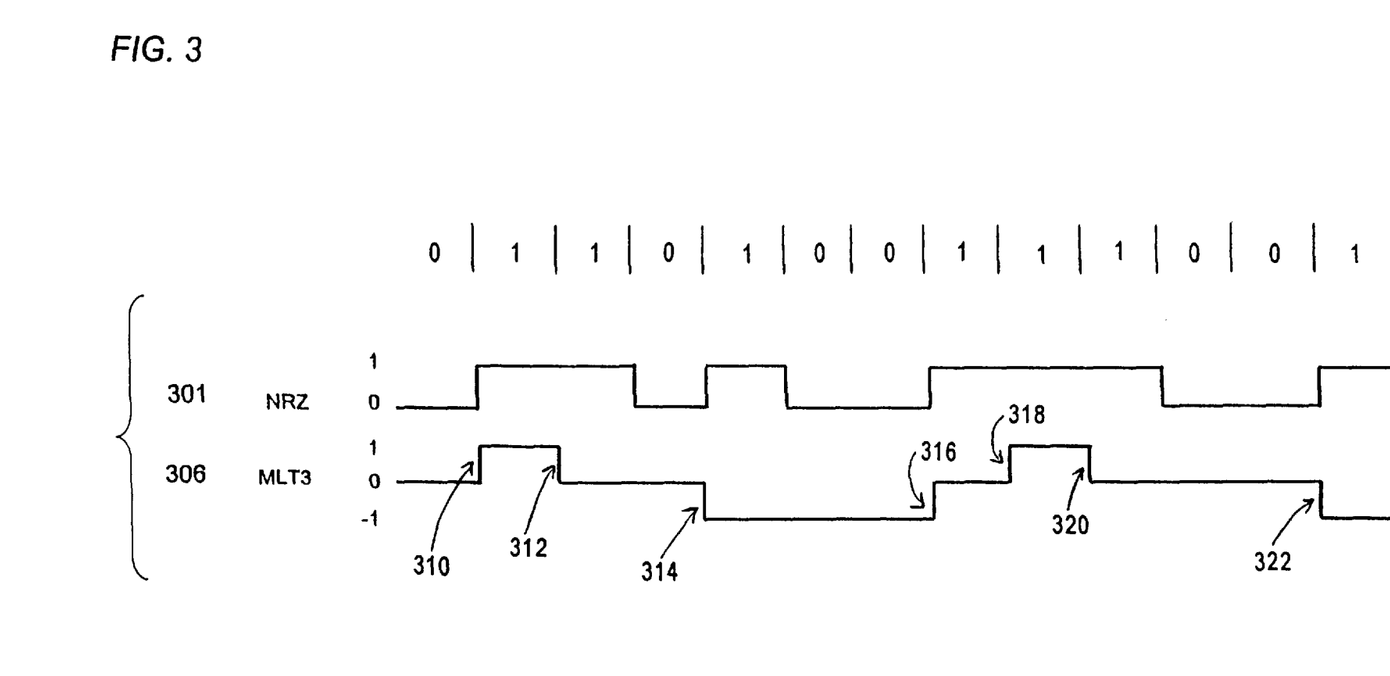
FIG. 3 is a diagram illustrating the relationship between MLT-3 and NRZ signaling.

As shown in FIG. 3, MLT-3 306 is similar to NRZ 301, with the exception that MLT-3 adds a third level of voltage to represent the data. The encoding from NRZ (non-return to zero) stream 301 to the signal on the 100Base-Tx driver is as follows. A NRZ 1 causes the 100Base-Tx driver to toggle to the next state, whereas an NRZ 0 does not cause a change in state. For example, assuming a stream of all NRZ 1's, the driver outputs −1, 0, +1, 0, −1, 0, +1, 0, etc. A transition equates to a NRZ 1, while no transition indicates a 0. The initial state is not important, as only the transitions convey information. The digital stream, 0 1 1 0 1 0 0 1 1 1 0 0 1, in FIG. 3, thus causes transitions 310, 312, 314, 316, 318, 320, and 322 at the leading edge of the following bits: $2^{nd}$, $3^{rd}$, $5^{th}$, $8^{th}$, $9^{th}$, $10^{th}$, and $13^{th}$, respectively.

MLT-3 uses a fundamental frequency one-half that of NRZ. Accordingly, MLT-3 provides the same data transmission rate as NRZ, but with lower spectral energy (e.g., lower electromagnetic interference emissions). For improved spectrum characteristics, MLT-3 may be combined with scrambling to eliminate repetitive patterns in the data. Such repetitive patterns introduce undesired spectral peaks (i.e., DC components). The present invention enables the generation of MLT-3 signals derived from NRZ signals by using a programmable line circuit.

Figure 4:
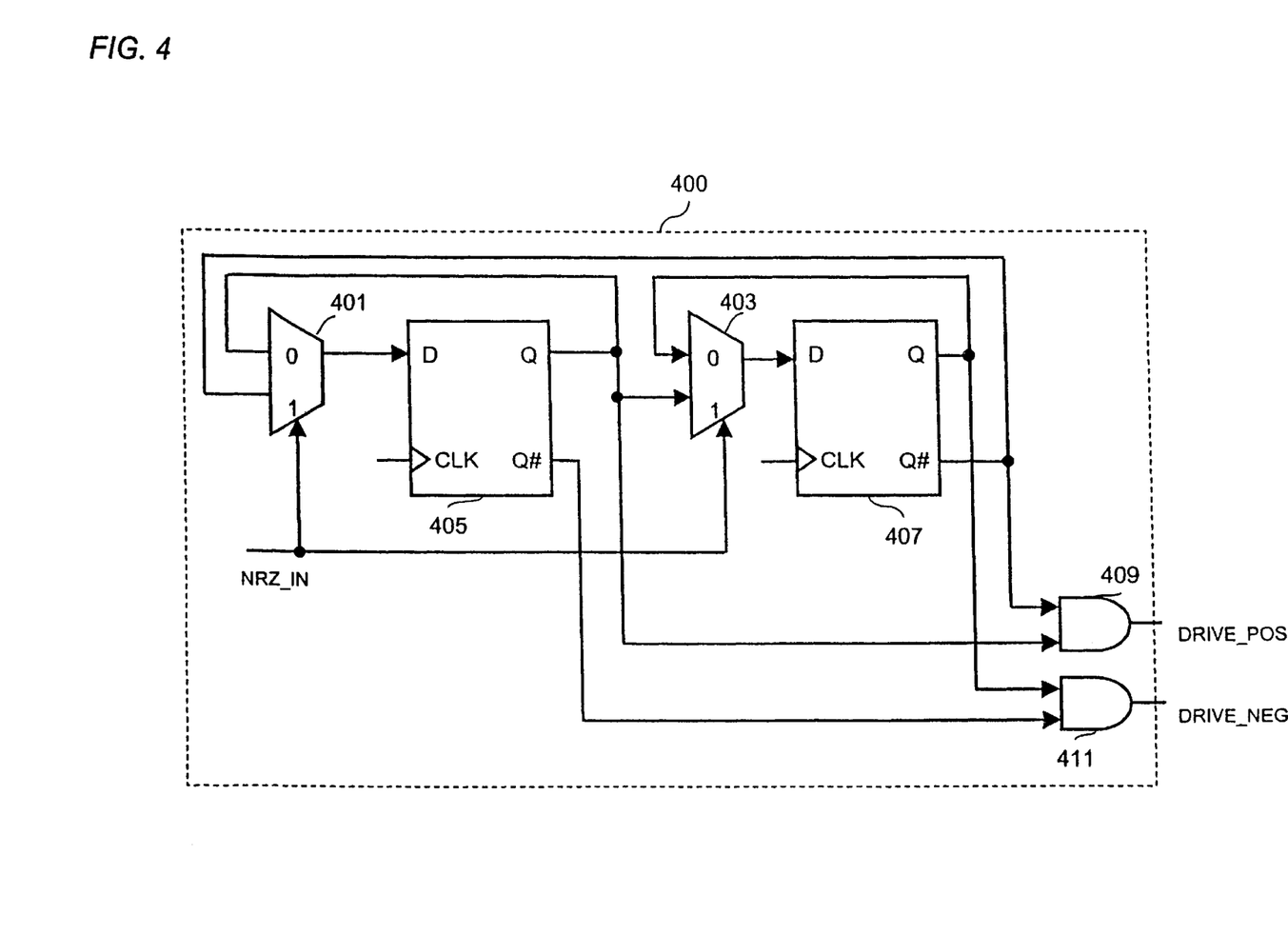
FIG. 4 is a diagram illustrating logic circuitry associated with translating NRZ signals to MLT-3 signals in accord with an embodiment of the present invention.

An exemplary non-return to zero (NRZ) translation logic 400, as in FIG. 4, can be used to provide the necessary translation of NRZ signals to MLT-3 signals. An NRZ input signal (NRZ_IN) serves as the select signal to two multiplexers (muxes) 401 and 403. In response to the NRZ_IN signal, the mux 401 outputs to one of the inputs of a D type flip flop 405. The D type flip flop 405 receives a clock signal (CLK) as its other input signal. The D type flip flop 405 essentially stores the NRZ_IN signal for a clock cycle synchronous with the NRZ_IN signal. Based upon its two inputs, flip flop 405 outputs, at its Q terminal, to an AND gate 409. The Q# terminal of flip-flip 405 is connected to a different AND gate 411. The other inputs to these AND gates 409, 411 originate from D type flip flop 407.

Flip flop 407 receives as inputs the output from multiplexer 403 and the CLK signal, which is the same clock signal supplied to flip flop 405. Mux 403 utilizes the NRZ_IN signal as the select signal. In response to its input signals, flip flop 407 outputs, at its Q terminal, to AND gate 411. The Q# output of flip flop 407 is supplied to AND gate 409. Thus, the AND gate 409 outputs a positive drive signal (DRIVE_POS) based upon its inputs from flip flops 405 and 407. Similarly, AND gate 411 supplies a negative drive signal (DRIVE_NEG) in response to the outputs of these two flip flops 405, 407. The NRZ translation logic 400 is coupled to a zero drive logic 610 (FIG. 6) to control a line circuit in accord with the present invention, as detailed later.

Figure 6:
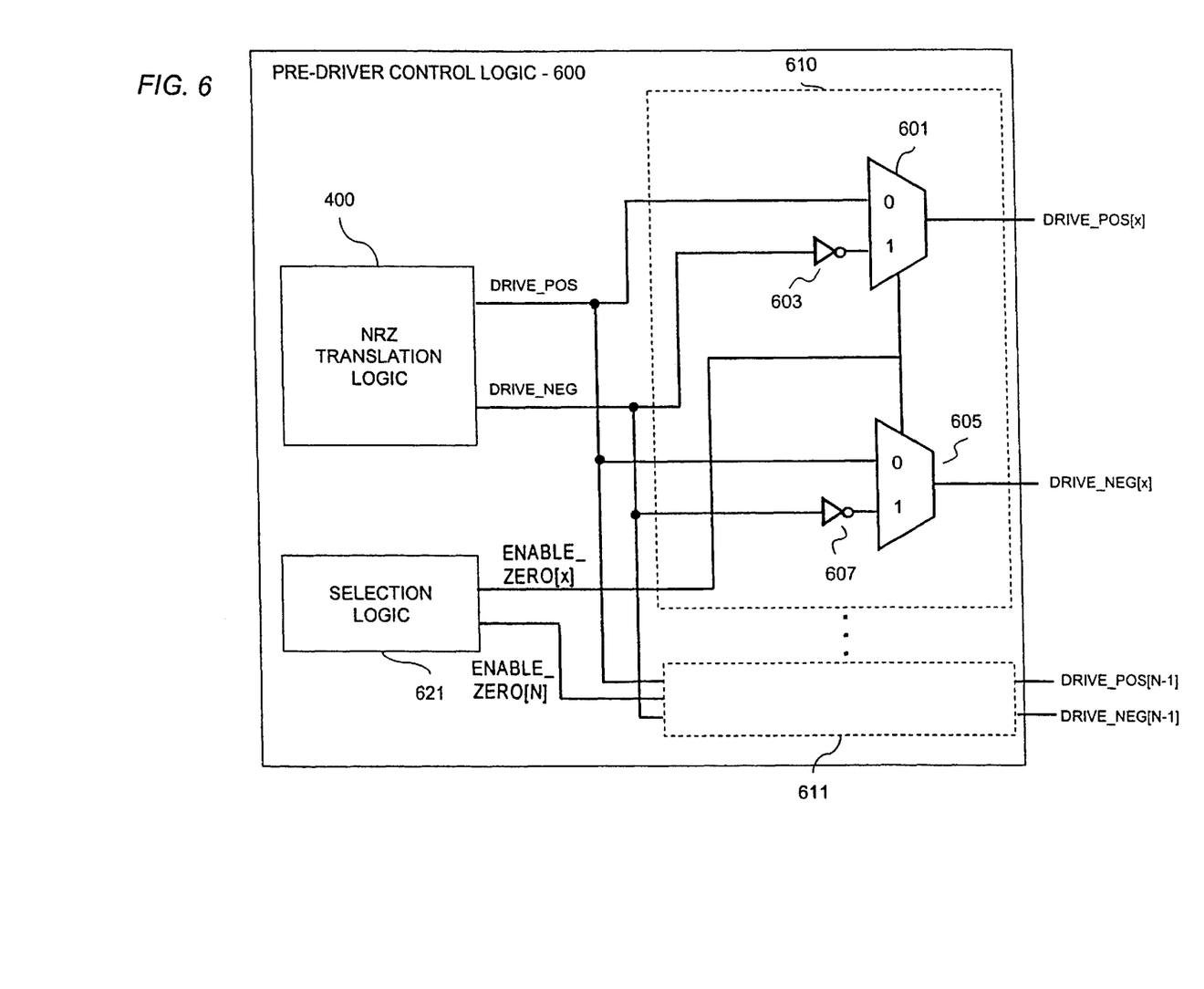
FIG. 6 is a diagram illustrating the pre-driver control logic associated with the pre-drivers of FIGS. 5a, 5b and 5c.

The logic circuit of FIG. 4 translates NRZ signals to MLT-3 signals, but does not provide a way to enhance slew rate. In contrast, according to one aspect of the present invention, additional logic is coupled to the translation logic to activate the pre-driver stages within the pre-driver system 501 during signaling of a symbolic zero. As previously discussed, by partially activating the final driver, an increase in slew rate can be realized. FIG. 6 shows how the NRZ translation logic 400 can be modified by zero-drive logic 610, 611 and selection logic 621 to effectively control, on an individual basis, the pre-driver stages 531, 533, 535, 541, 543 and 545. The pre-driver logic 600 of FIG. 6 is discussed in more detail later on.

Figure 5A:
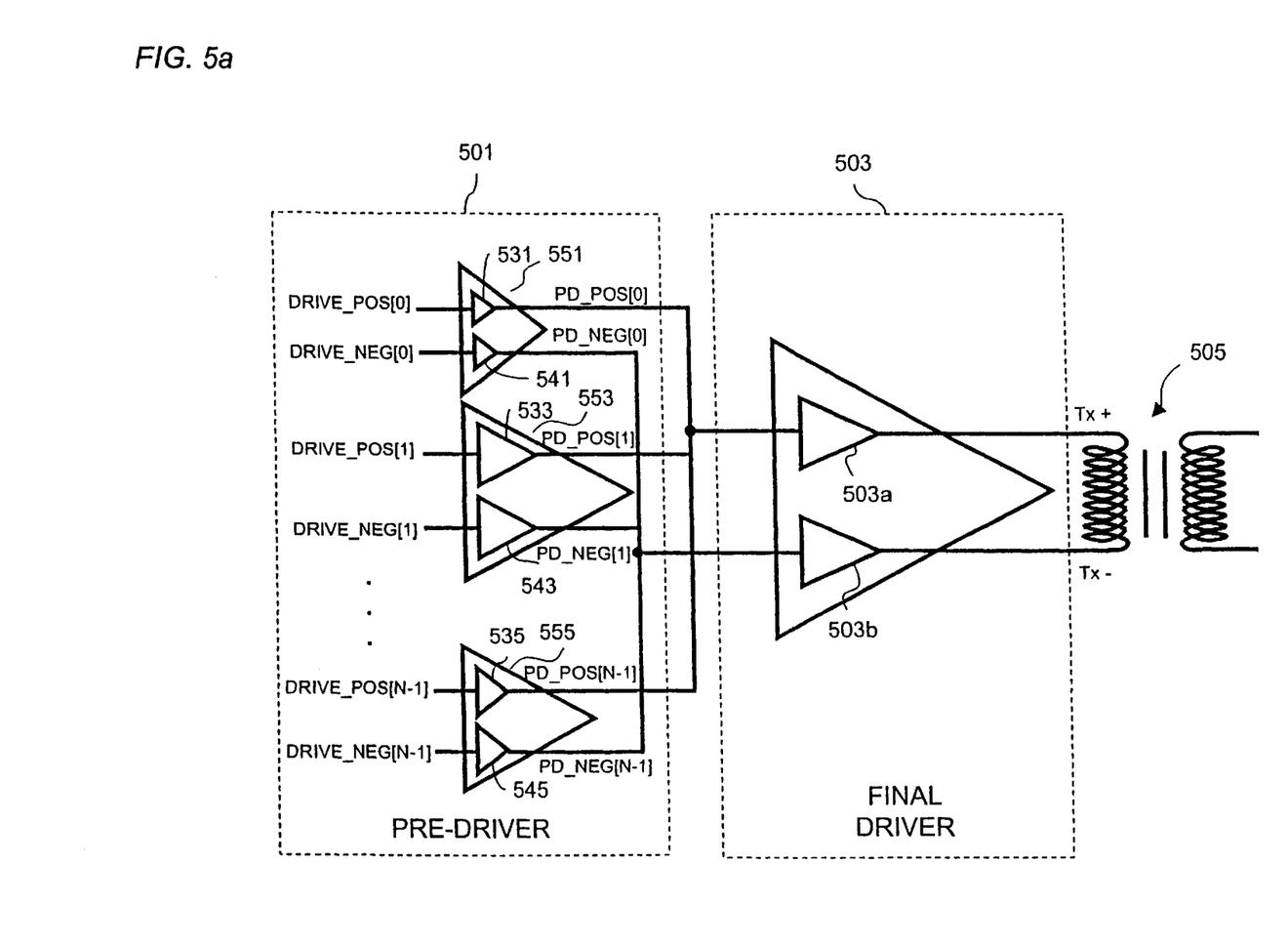
FIGS. 5a, 5b and 5c are schematic diagrams illustrating a line driver according to an embodiment of the present invention.
Figure 5B:
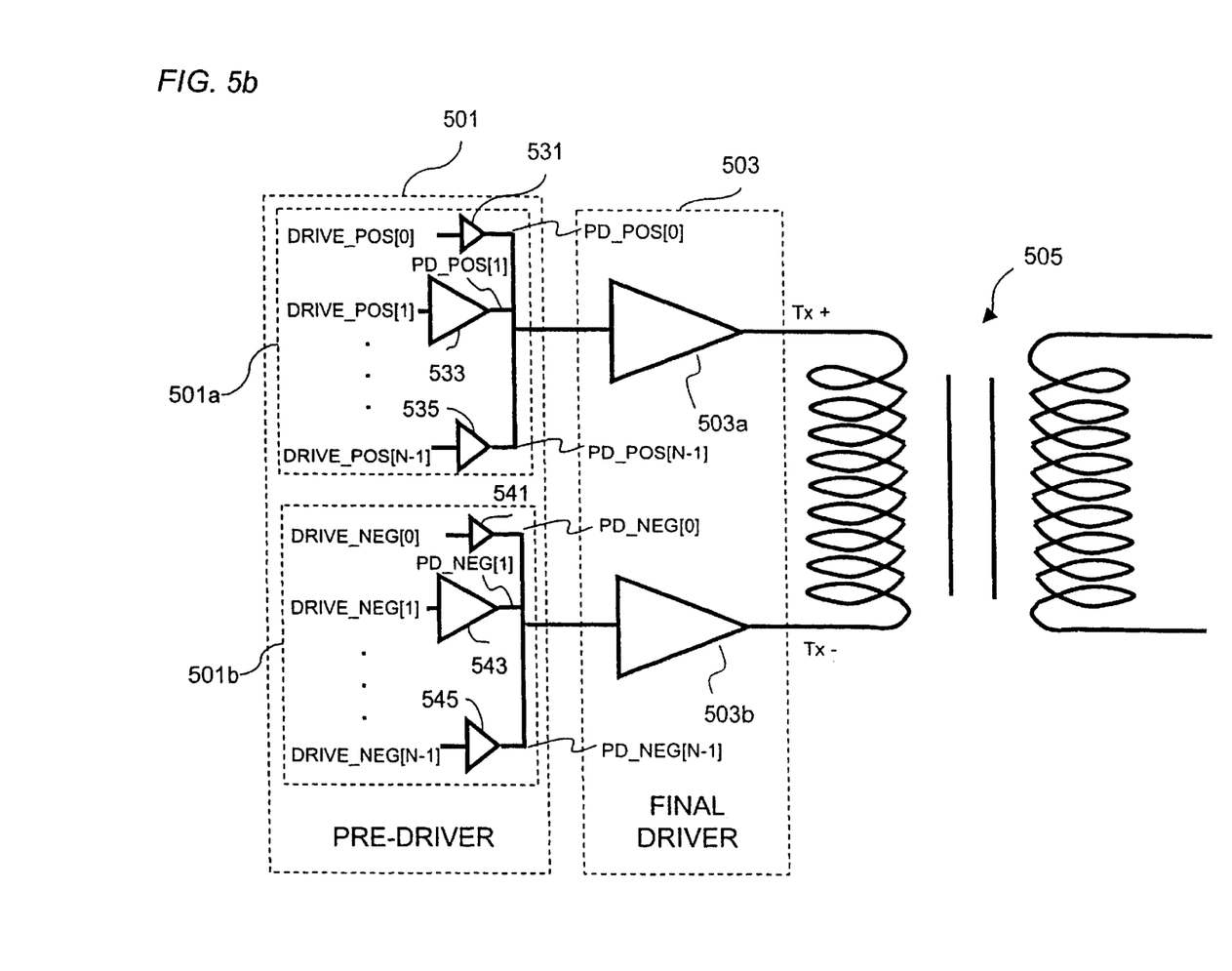
Figure 5C:
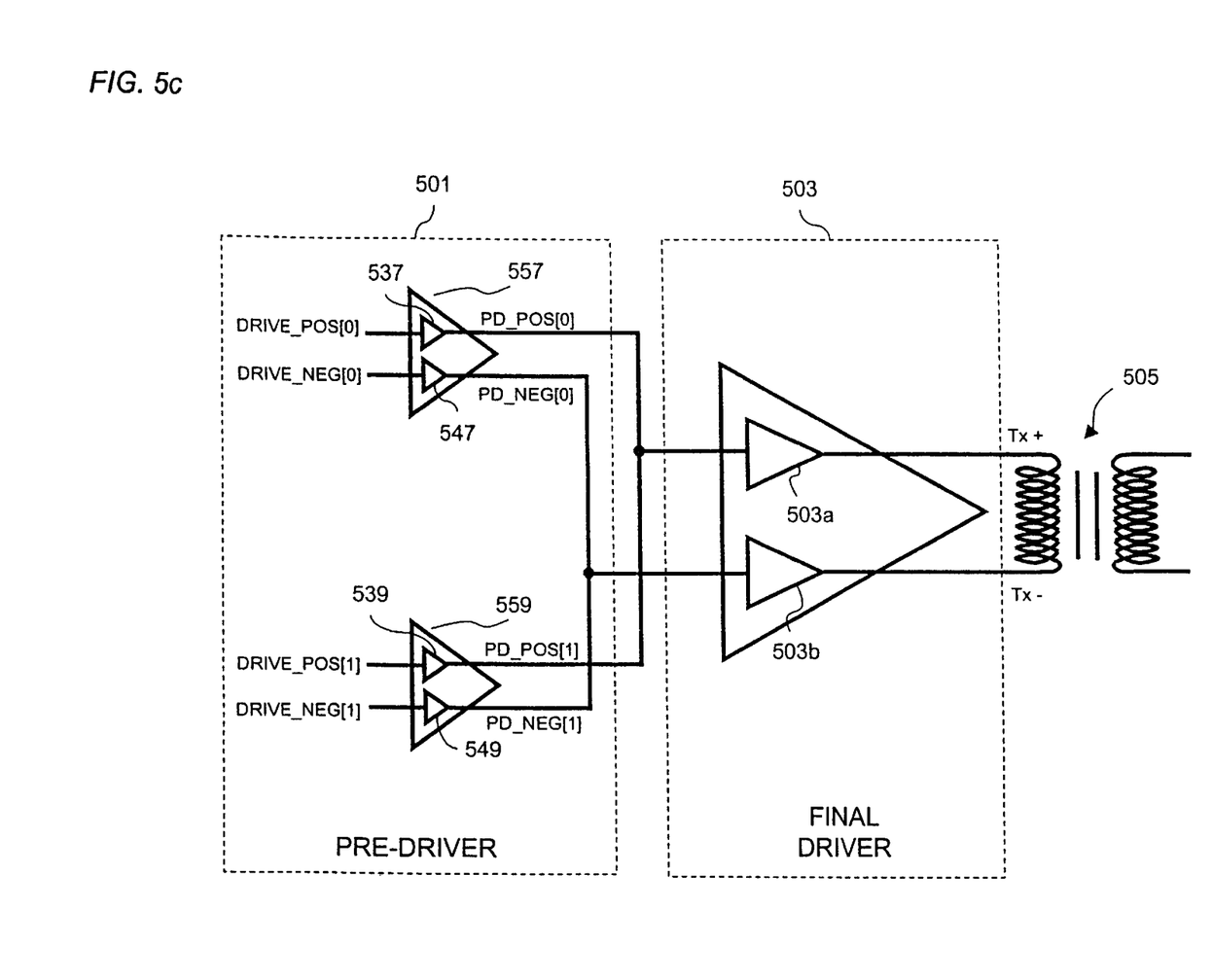

FIGS. 5a, 5b and 5c show the line circuit in accord with an embodiment of the present invention, having two driver stages. As shown in FIG. 5a, the first stage is a pre-driver circuit 501. The pre-driver circuit 501 comprises multiple individual pre-drivers 551, 553, and 555. Each individual pre-driver has a positive signal generator and a negative signal generator, associated with input signals DRIVE_POS [N−1] and DRIVE_NEG[N−1], respectively. The notation DRIVE_POS[N−1] refers to an input signal supplied to the positive signal generator 535 of pre-driver N−1. Similarly, DRIVE_NEG[N−1] denotes the input signal to the negative signal generator 545. Individual pre-driver 551 includes positive signal generator 531 (which outputs PD_POS[0]) and negative signal generator 541 (which outputs PD_NEG [0]); pre-driver 553 includes positive signal generator 533 (which outputs PD_POS[1]) and negative signal generator 543 (which outputs PD_NEG[1]); and pre-driver 555 includes positive signal generator 535 (which outputs PD_POS[N−1]) and negative signal generator 545 (which outputs PD_NEG[N−1]). The terms pre-driver stage and signal generator are used synonymously herein.

The individual pre-driver stages may possess different gains. For instance, pre-driver 553 is a full-gain type, whereas pre-drivers 551 and 555 are a quarter-gain type, and a half-gain type, respectively. The terms "quarter-gain" and "half-gain" are relative to the "full-gain". These pre-drivers 551, 553, 555 supply positive and negative output signals to the final driver 503, which in turn outputs a positive output signal and a negative output signal to the transformer 505. It should be noted that the gains of the pre-drivers may be programmable to readily adapt to a variety of applications.

Conceptually, the two opposite signal generators that are found within each individual pre-drivers 551, 553, 555 can be grouped in two categories: a positive pre-driver group 501a and a negative pre-driver group 50b (as in FIG. 5b). Positive pre-driver group 501a, which generates a collective positive input signal, comprises positive pre-driver stages (or signal generators) 531, 533, and 535. Likewise, the negative pre-driver group 501b includes negative pre-driver stages 541, 543, and 545; these negative signal generators produce a collective negative input signal. The number of individual pre-drivers within each pre-driver groups 501a, 501b may vary from 1 to N, depending on the particular application. The larger the number of individual pre-drivers used, the larger the amplitude of the cumulative signal that is received by the final driver 503. Thus, the amplitude may be readily programmed by activating any number of individual pre-drivers, up to N. Each of these individual pre-drivers within the pre-driver circuit 501 is separately controlled in generating the collective positive input signal and the collective negative input signal supplied to the positive signal generator 503a and the negative signal generator 503b, respectively, of the final driver 503.

The pre-driver groups 501a and 501b are responsible for generating the MLT-3 signals for transmission. A symbolic +1 signal is generated when the positive pre-driver group 501a is ON and the negative pre-driver group 501b is OFF. Likewise, the negative pre-driver group 501b produces a −1 when it is ON and the positive pre-driver group 501a is OFF. The generation of the 0 signal is different than prior art systems. In theory, both pre-driver systems 501a, 501b should be turned OFF to produce a 0 signal so that power consumption is minimized. However, the transition time (i.e., edge rate) from 0 to +1 or 0 to −1 increases because the final driver 503 is fully OFF. That is, there is significant lag time to turn the final driver 503 fully ON from a completely OFF state; whereas, if the final driver 503 were kept partially ON, the lag time would be substantially reduced.

The use of individual pre-drivers, in accord with an embodiment of the present invention, reduces the lag time by activating a selected group of pre-drivers 501a, 501b to output a positive collective signal and a negative collective signal, respectively, during a zero state; i.e., when the MLT-3 signal has a zero value. In other words, at least one of the individual pre-drivers within the pre-driver system 501 has its signal generators simultaneously turned ON during a zero signaling state. This concept of partially turning ON the pre-driver system (and thus the final drivers) is termed "zero drive." For example, pre-driver 555 may be selected by the selection logic (621 of FIG. 6) as a zero drive, whereby signal generators 535 and 545 are turned ON when a zero signal is to be transmitted. If either a +1 or a −1 signal is being generated, only the corresponding positive or negative signal generators within all the pre-drivers that are designated as zero drives are turned ON.

Continuing with the example with pre-driver 555 as the selected zero-drive, signal generators 535 and 545 are the only signal generators that are active when a zero signal is transmitted. During the zero signaling state, the zero drive pre-driver 555 turns ON both the positive signal generator 535 and the negative signal generator 545 to cancel the effects of each generator's contribution to the positive collective signal and the negative collective signal. This permits the final driver 503 to be partially ON without affecting the output signals. For the pre-driver circuit 501 to produce a symmetric signal, the number of positive signal generators that are turned ON within the positive group 501a should equal the number of negative signal generators of the negative group 501b.

FIG. 5c shows a symmetric arrangement whereby individual pre-drivers 557 and 559 are of the same gain.

Pre-driver 557 is made up of two signal generators 537 and 547; likewise, pre-driver 559 comprises 539 and 549. The circuit of FIG. 5c is discussed later on in the context of the signals shown in FIG. 7.

It should be realized that asymmetric signals can be achieved if an application requires it by turning ON an unequal amount of positive and negative signal generators. Because the pre-driver groups 501a, 501b are partially ON (i.e., zero drive is enabled), the edge rate is increased. Further, the increased power consumption at a zero signaling state advantageously result in a less noisy power supply. The trade-off between edge performance and power consumption is controllable via a pre-driver control logic, which is discussed later.

As mentioned previously, the individual pre-drivers within the pre-driver stage (FIGS. 5a and 5b) may not all be of identical gain. For example, three types of pre-drivers of varying gains can be used: (1) full-gain driver 553, (2) half-gain driver 555, and (3) quarter-gain driver 551. The selection of the types of pre-drivers depends on the level of amplitude resolution desired. Preferably, the pre-driver system 501 is made up of seven full-gain drivers, a half-gain driver and a quarter-gain driver. The actual values of these pre-drivers depend on the specific application; however, it is usually desirable employ values that yield a total of +1V and −1V on the other side of the transformer 505. Moreover, in one embodiment, quarter-gain pre-drivers can be utilized to form the half-gain and the full-gain pre-drivers. That is, two quarter-gain pre-drivers are configured to create a half-gain pre-driver. Likewise, four quarter-gain pre-drivers are used to produce a full gain pre-driver. This approach advantageously enhances component matching and eliminates the need to construct truly different pre-drivers, resulting in developmental and manufacturing cost savings.

FIG. 6 shows the pre-driver control logic 600. Selection logic 621 is used in conjunction with zero drive logic 610, 611 to select the number of individual pre-drivers that are zero drive pre-drivers. One embodiment contemplates the use of zero drive logic 610, 611 for each individual pre-driver (e.g., 551, 553 and 555) in order to control each pre-driver stage (e.g., 531, 533, 535, 541, 543 and 545) on an individual basis. Thus, N number of zero-drive logic circuits (e.g., 610, 611) are required to control N individual pre-drivers. A lesser amount of zero drive logic circuits (e.g., 610, 611) may be employed, but with reduced control. The circuit of FIG. 6 is described below.

The outputs, DRIVE_POS and DRIVE_NEG, of the NRZ Translation Logic 400, are supplied to muxes 601 and 605. The "0" input lead of mux 601 receives the DRIVE_POS signal; the "1" input lead connects to an inverter 603, which inverts the received DRIVE_NEG signal. Mux 605 similarly receives the input signals as mux 601, but at opposite input leads. The DRIVE_NEG signal is supplied to the "0" input lead and the DRIVE_POS to the "1" input lead, which couples to inverter 607. Each mux 601, 605 has an ENABLE_ZERO[x] signal as the select signal; this enable signal is output from selection logic 621. The selection logic 621 also supplies a corresponding enable signal to each pre-driver. The ENABLE_ZERO[x] signal at logic high indicates that the corresponding individual pre-driver x is zero drive enabled (i.e., will be ON during the transmission of the 0 signal). With zero drive capability, the slew rate of the outputs of the final driver stage 503 can attain higher rates with significantly reduced ringing.

Figure 7A:
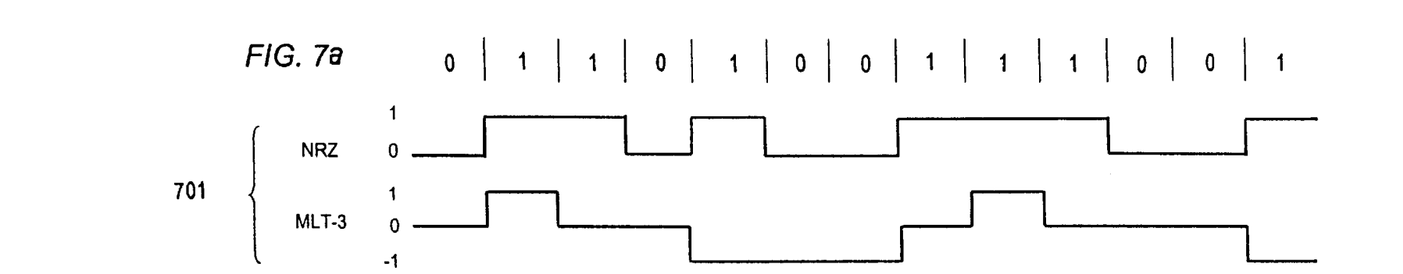
FIGS. 7a through 7c show a signal diagram illustrating the relationships of the output signals of the circuit in FIG. 5c.
Figure 7B:
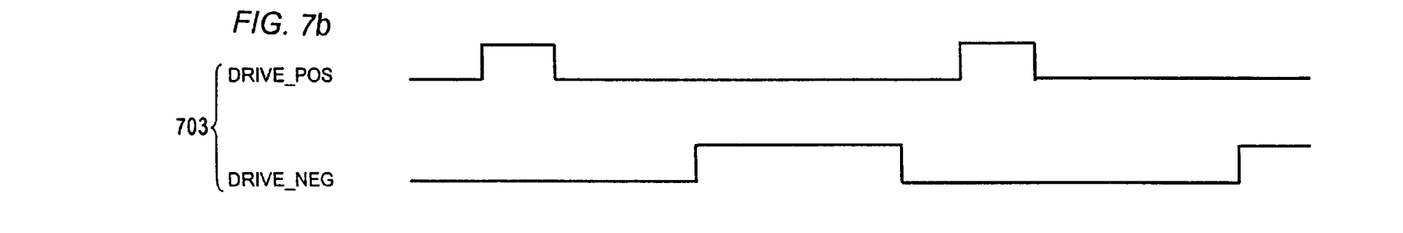
Figure 7C:
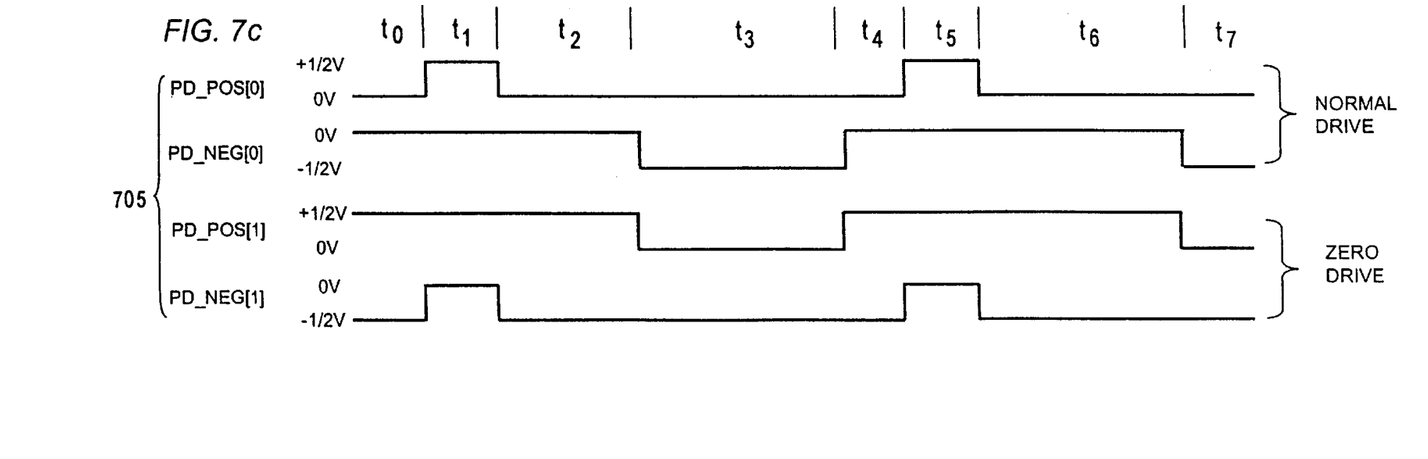

FIG. 7 is a signal diagram that illustrates the operation of the line circuit of FIG. 5c. As shown at 701, a NRZ bit stream has been translated into a MLT-3 stream by, for example, the NRZ translation logic circuit of FIG. 4. The DRIVE_POS and DRIVE_NEG signals are generated by the NRZ translation logic 400 to the zero-drive logic circuits 610 and 611, which in response output the signals DRIVE_POS[0], DRIVE_NEG[0], DRIVE-POS[1], and DRIVE_NEG[1] (as shown in FIG. 5c). At 705 of FIG. 7, pre-driver 0 (557) is designated by the selection logic 621 (of FIG. 6) as a normal pre-driver, and pre-driver 1 (559) is designated as zero drive enabled. For illustrative purposes, the output amplitudes of the positive signal generators 537, 539 are set at +½V, and the output amplitudes of the negative signal generators 547, 549 are set at −½V. At time $t_0$, DRIVE_POS and DRIVE_NEG are both zero, indicating a zero signaling state; thus, the zero drive pre-driver 1 (559) activates both the positive signal generator 539 and the negative signal generator 549 to yield an effective 0. The signal generators 537 and 547 of normal pre-driver 557 are OFF during $t_0$. This scenario is true for the other zero signaling states at $t_2$, $t_4$, and $t_6$. As evident from 705, the positive signal generator 539, which is driven by signal DRIVE_POS[1], is activated during transmission of a symbolic 0 and a symbolic +1. Negative signal generator 549 asserts at a symbolic 0 and a symbolic −1. The positive signal generator 537 of normal pre-driver 557 asserts when a symbolic +1 is transmitted at times $t_1$ and $t_5$. When a symbolic +1 is to be transmitted, both positive signal generators 537, 539 are ON, and both negative signal generators 547, 549 are OFF. Each of the positive signal generators 537 and 539, corresponding to output signals PD_POS[0] and PD_POS[1] respectively, supplies one-half of the total output amplitude, which is +1V. Negative signal generator 547, which outputs the PD_NEG[0] signal, asserts when a −1 is driven at $t_3$ and $t_7$. In other words, the positive signal generators 537 and 539 are OFF, while the negative signal generators 547 and 549 are ON, yielding an output signal value of −1. By operating in the manner described above, the final driver 503 is partially ON during a zero signaling state, and thereby, enhances the slew rate of the output signals while minimizing power consumption.

Although the above example utilizes only two pre-drivers 557, 559 with identical gains, it should be appreciated that in general when more than two individual pre-drivers are utilized, the pre-drivers can be partitioned such that any combination of normal pre-drivers and zero drive pre-drivers can be programmed to adapt to a particular application. Furthermore, the gains of these pre-drivers may likewise be programmed.

According to the disclosed embodiment, the zero drive capability enhances the slew rate as well as provide noise reduction in the power line. The line circuit does not require components such as resistors and capacitors to modify the edge rates, thereby saving chip real estate and reducing power consumption. The arrangement permits programming of the line circuit to adapt to different voltage requirements. That is, no fine tuning of RC elements is required.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A line circuit for transmitting encoded signals, comprising:

a pre-driver circuit comprising positive pre-driver stages for outputting positive pre-drive output signals in response to first input signals, respectively, and negative pre-driver stages for outputting negative pre-drive output signals in response to second pre-driver input signals, respectively, the pre-driver circuit outputting a positive collective signal based on the positive pre-drive output signals and a negative collective signal based on the negative pre-drive output signals;

pre-driver control logic for generating the first and second input signals based on a first driver signal and a second driver signal, the pre-driver control logic selecting at least one of the positive pre-driver stages and at least one of the negative pre-driver stages for outputting the respective positive and negative pre-drive output signals in response to a zero state in the first and second driver signals; and an output driver for generating first and second output signals as the encoded signals in response to the positive and negative collective signals, respectively.

2. The line circuit of claim 1, wherein the pre-driver control logic comprises:

non-return to zero (NRZ) translation logic for translating NRZ encoded signals to tri-state encoded signals; and zero drive logic for selecting at least one of the positive pre-driver stages and at least one of the negative pre-driver stages to output the respective positive and negative pre-drive output signals in response to the zero state.

3. The line circuit of claim 2, wherein the pre-driver control logic further comprises selection logic for providing zero drive enable signals to the zero drive logic, the zero drive enable signals instructing the positive pre-driver stages and negative pre-driver stages to output the respective positive and negative pre-drive output signals in response to the zero state.

4. The line circuit of claim 2, wherein the zero drive logic comprises:

a first multiplexer for receiving a drive positive input signal and a drive negative input signal from the NRZ translation logic and selecting the one or more positive pre-driver stages in response to a zero drive enable signal, the first multiplexer being coupled to a first inverter, the first inverter receiving the drive negative input signal; and a second multiplexer for receiving the drive positive input signal and the drive negative input signal from the NRZ translation logic and selecting the one or more negative pre-driver stages in response to a zero drive enable signal, the second multiplexer being coupled to a second inverter, the second inverter receiving the drive negative input signal, wherein the first multiplexer and second multiplexer output a drive positive output signal and a drive negative output signal, the drive positive output signal and the drive negative output signal being associated with particular positive and negative pre-driver stages respectively.

5. The line circuit of claim 1, wherein each of the positive pre-driver stages is paired with each of the negative pre-driver stages, the pre-driver control logic individually controls each pair, the pairs being arranged in parallel.

6. The line circuit of claim 1, wherein the first and second output signals are outputted according to a Multilevel Transmission-3 (MLT-3) protocol.

7. The line circuit of claim 1, wherein each of the positive and negative pre-driver stages is either of a full-gain type, a half-gain type, or a quarter-gain type.

8. The line circuit of claim 7, wherein the full-gain type pre-driver stage comprises four quarter-gain type pre-driver stages, and the half-gain type pre-driver stage comprises two quarter-gain type pre-driver stages.

9. The line circuit of claim 8, wherein the pre-driver circuit comprises seven full-gain type pre-driver stages, one half-gain type pre-driver stage, and one four quarter-gain pre-driver stage.

10. A line circuit for transmitting encoded signals, comprising:

a pre-driver circuit configured for generating a collective positive input signal and a collective negative input signal and comprising a plurality of individual pre-drivers, each of the individual pre-drivers comprising a positive signal generator and a negative signal generator that operate according to a corresponding gain;

a final driver coupled to the pre-driver system for generating a positive output signal and a negative output signal in response to the collective positive input signal and the collective negative input signal; and pre-driver control logic for activating a selected individual pre-driver to turn ON both positive signal generators and negative signal generators simultaneously during a zero signaling state, the pre-driver control logic individually controlling each of the plurality of individual pre-drivers.

11. The line circuit of claim 10, wherein the pre-driver control logic comprises:

non-return to zero (NRZ) translation logic for translating NRZ encoded signals to tri-state encoded signals; and zero drive logic for selecting the individual pre-driver to turn ON during the zero signaling state.

12. The line circuit of claim 11, wherein the zero drive logic comprises:

a first multiplexer responsive to a zero drive enable signal that is associated with a particular individual pre-driver for receiving a drive positive input signal and a drive negative input signal from the NRZ translation logic, the first multiplexer being coupled to a first inverter, the first inverter receiving the drive negative input signal; and a second multiplexer responsive to the zero drive enable signal for receiving the drive positive input signal and the drive negative input signal from the NRZ translation logic, the second multiplexer being coupled to a second inverter, the second inverter receiving the drive negative input signal, wherein the first multiplexer and second multiplexer output a drive positive output signal and a drive negative output signal respectively, the drive positive output signal and the drive negative output signal being associated with the particular individual pre-driver.

13. The line circuit of claim 10, wherein the individual pre-drivers are arranged in parallel.

14. The line circuit of claim 10, wherein the positive output signal and the negative output signal are outputted according to Multilevel Transmission-3 (MLT-3) protocol.

15. The line circuit of claim 10, wherein the gains are of a full-gain type, a half-gain type, and a quarter-gain type.

16. The line circuit of claim 10, wherein higher gain pre-drivers each comprises multiple lower gain pre-drivers.

17. The line circuit of claim 15, wherein the full-gain type pre-driver comprises four quarter-gain type pre-drivers, the half-gain type pre-driver comprising two quarter-gain type pre-drivers, the pre-driver system comprising seven full-gain type pre-drivers, one half-gain type pre-driver, and one four quarter-gain type pre-driver.

18. A method of transmitting data signals on a network medium, the method comprising:

supplying first and second pre-driver signals to a first positive pre-driver stage and a first negative pre-driver stage based on received first and second driver signals, respectively;

supplying first and second inverted pre-driver signals, having inverse values relative to the first and second pre-driver signals, to a second positive pre-driver stage and a second negative pre-driver stage, respectively;

outputting a positive collective signal based on outputs from the first and second positive pre-driver stages, the second positive pre-driver stage being active during a zero state;

outputting a negative collective signal based on outputs from the first and second negative pre-driver stages, the second negative pre-driver stage being active during the zero state; and generating first and second output signals as the data signals based on the positive and negative collective signals, respectively.

19. The method of claim 18, further comprising:

translating a non-return to zero (NRZ) encoded signal to a tri-state encoded signal via NRZ translation logic; and controlling the second positive and second negative pre-driver stages to turn ON during the zero state.

20. The method of claim 19, wherein the step of controlling further comprises:

receiving a drive positive input signal and a drive negative input signal from the NRZ translation logic at a first multiplexer and a second multiplexer;

outputting a drive positive output signal by the first multiplexer based upon a zero drive enable signal, the drive positive output signal being associated with the first and second positive pre-driver stages that are used to produce the collective positive input signal; and outputting a drive negative output signal by the second multiplexer based upon the zero drive enable signal, the drive negative output signal being associated with the first and second negative pre-driver stages.

21. The method of claim 18, wherein the first and second output signals are outputted according to Multilevel Transmission-3 (MLT-3) protocol.

22. The method of claim 18, wherein the positive and negative pre-driver stages are of a full-gain type, a half-gain type, and a quarter-gain type.

* * * * *